United States Patent Office 3,218,321
Patented Nov. 16, 1965

3,218,321
TETRAHYDROPYRIMIDYL AND IMIDAZOLINYL-NAPHTHOATES
Shoji Toyoshima, Tokorozawa-shi, Nobumichi Morishita, Bunkyo-ku, Tokyo, and Nobuyoshi Otsuka, Toshima-ku, Tokyo, Japan, assignors to Eisai Kabushiki Kaisha, Tokyo, Japan, a corporation of Japan
No Drawing. Filed Dec. 9, 1963, Ser. No. 329,274
Claims priority, application Japan, Mar. 6, 1963, 38/10,367
11 Claims. (Cl. 260—251)

This invention relates to a process for the production of new derivatives of hydroxynaphthoic acid ester represented by the formula:

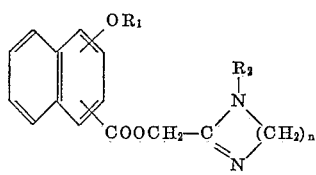

where in $R_1$ and $R_2$ each stands for a hydrogen atom or a lower alkyl group and $n$ is a whole number of 2 or 3.

The new compounds of this invention show various pharmacological effects such as high analgetic and local anesthetic actions and the like on central nervous system, and they accordingly are useful as medicaments.

The novel compounds of this invention may be prepared in accordance with a process known for preparation of usual carboxylic acid esters by reacting under heat hydroxynaphthoic acid, alkyl ether or salt thereof in the absence or presence of suitable organic solvent such as ethanol and isopropanol with a compound represented by the formula:

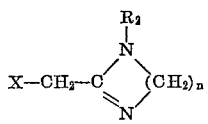

wherein X stands for halogen atom such as chlorine or bromine and $R_2$ and $n$ have the previously-recited significance.

The process may be conducted in the presence of a catalyst such as potasium iodide, and there is thereby obtained an increased yield of the product.

The reaction sequence which may take place during the process of this invention is explained as follows:

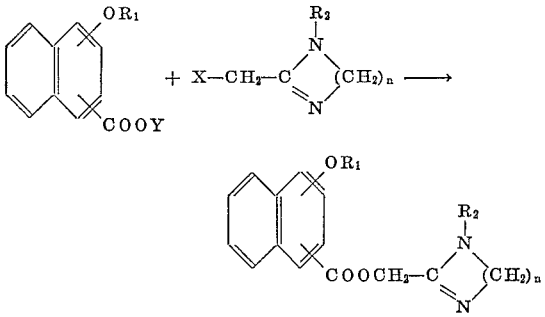

wherein Y stands for hydrogen atom or an alkali metal atom, X for halogen atom such as chlorine and bromine and $R_2$ and $n$ have the previously-recited significance.

The process of the present invention is illustrated by the following examples.

*Example I.—(2'-imidazolinyl)-methyl-1-methoxy-2-naphthoate*

To 4.56 grams of 2-chloromethyl-2-imidazoline hydrochloride dissolved in ethanol was added a calculated amount of sodium alcoholate. An inorganic substance which separated out was removed by filtration. To the filtrate were added 6.07 grams of 1-methoxy-2-naphthoic acid, 50 ml. of isopropanol and 0.2 gram of potassium iodide. The solvent was removed by distillation until the residual solution had a half of the initial volume and then heated under reflux for four hours.

On cooling, a crystalline substance which separated out was recovered, washed with acetone and recrystallized from a mixture of acetone and methanol. The hydrochloride of the product thus obtained at the yield of 5.1 grams (53%) had a melting point of 206–207° C. (with decomposition).

The analysis was as follows:

|  | C | H | N | Cl |
|---|---|---|---|---|
| Calculated | 59.86 | 5.34 | 8.73 | 11.05 |
| Found | 60.01 | 5.88 | 9.00 | 11.10 |

*Example II.—(2'-imidazolinyl)-methyl-1-ethoxy-2-naphthoate*

9.30 grams of 2-chloromethyl-2-imidazoline hydrochloride were dissolved in ethanol. To the solution thus obtained was added a calculated amount of sodium alcoholate. An inorganic substance which separated out was removed by filtration.

To the filtrate was added 12.96 grams of 1-ethoxy-2-naphthoic acid, and the reaction mixture was further worked up by the procedure as mentioned in Example I. The product thus obtained as hydrochloride when recrystallized from a mixture of acetone and ethanol had a melting point of 114–115° C. (with decomposition). The yield was 5.5 grams which corresponded to 27% of the theoretical value.

The analysis was as follows:

|  | C | H | N |
|---|---|---|---|
| Calculated | 60.95 | 5.72 | 8.38 |
| Found | 61.02 | 5.47 | 8.02 |

*Example III.—(2'-imidazolinyl)-methyl-1-hydroxy-2-naphthoate*

1-hydroxy-2-naphthoic acid was subjected to reaction in a manner similar to that mentioned in Example I. The hydrochloride of (2'-imidazolinyl)-methyl-1-hydroxy-2-naphthoate thus obtained at the yield of 41.2% had a melting point of 334–335° C. (with decomposition).

The analysis of the product was as follows:

|  | C | H | N |
|---|---|---|---|
| Calculated | 58.68 | 4.93 | 9.13 |
| Found | 58.54 | 5.17 | 8.77 |

*Example IV.—(3',4',5',6'-tetrahydropyrimidyl)-methyl-1-hydroxy-2-naphthoate*

4.0 grams of 2-chloromethyl-3,4,5,6-tetrahydropyrimidine hydrochloride were converted by treating a calculated amount of sodium methylate to the corresponding free base.

To the base were added 4.0 grams of 1-hydroxy-2-naphthoic acid and the whole in isopropanol was refluxed for four hours.

The solvent was then removed by distillation and the residue was subjected to crystallization with addition of acetone. Hydrochloride of the product had a melting point of 224–225° C. (with decomposition). The yield was 1.5 grams corresponding to 23% of the theoretical value.

The analysis was as follows:

|  | C | H | N |
|---|---|---|---|
| Calculated | 59.86 | 5.34 | 8.73 |
| Found | 59.85 | 5.21 | 8.31 |

*Example V.—(3',4',5',6'-tetrahydroprimidyl)-methyl-1-methoxy-2-naphthoate*

The product aimed at was obtained by reacting 1-methoxy-2-naphthoic acid with 2-chloromethyl-3,4,5,6-tetrahydropyrimidine hydrochloride in accordance with a procedure similar to that mentioned in Example IV. The product in a form of hydrochloride thus obtained had a melting point of 214–215° C. (with decomposition).

The yield was 45.2% of the theory and the analysis was as follows:

|  | C | H | N |
|---|---|---|---|
| Calculated | 60.95 | 5.72 | 8.36 |
| Found | 60.81 | 5.45 | 8.86 |

*Example VI.—(3',4',5',6'-tetrahydropyrimidyl)-methyl-ethoxy-2-naphthoate*

1-ethoxy-2-naphthoic acid and 2-chloromethyl-3,4,5,6-tetrahydropyrimidine hydrochloride were subjected to reaction in accordance with the procedure similar to that mentioned in Example IV. The product in a form of the hydrochloride thus obtained had a melting point of 199–200° C. (with decomposition).

The yield was 25.7% of the theoretical value.

The analysis of the product was as follows:

|  | C | H | N |
|---|---|---|---|
| Calculated | 61.94 | 6.07 | 8.03 |
| Found | 61.93 | 5.96 | 8.26 |

*Example VII.—(3',4',5',6'-tetrahydropyrimidyl)-methyl-2-naphthoate*

2-methoxy-1-naphthoic acid and 2-chloromethyl-3,4,5,6-tetrahydropyrimidine hydrochloride were subjected to reaction in accordance with the procedure similar to that mentioned in Example IV. The product in a form of hydrochloride thus obtained had a melting point of 129–130° C. (with decomposition).

The yield was 42% and the analysis was as follows:

|  | C | H | N |
|---|---|---|---|
| Calculated | 60.95 | 5.72 | 8.36 |
| Found | 61.02 | 5.68 | 8.28 |

*Example VIII.—(2'-imidazolinyl)-methyl-2-methoxy-1-naphthoate*

2-methoxy-1-naphthoic acid and 2-chloromethyl-2-imidazoline hydrochloride were subjected to reaction in a procedure similar to that mentioned in Example I. The product in a form of hydrochloride thus obtained had a melting point of 172–174° C. (with decomposition). The yield was 31.2% and the analysis was as follows:

|  | C | H | N |
|---|---|---|---|
| Calculated | 59.86 | 5.34 | 8.73 |
| Found | 60.05 | 5.57 | 8.39 |

*Example IX.—(3',4',5',6'-tetrahydropyrimidyl)-methyl-2-ethoxy-1-naphthoate*

2-ethoxy-1-naphthoic acid and 2-chloromethyl-3,4,5,6-tetrahydropyrimidine hydrochloride were subjected to reaction in accordance with a procedure similar to that mentioned in Example IV. The product in a form of hydrochloride thus obtained had a melting point of 195–197° C. (with decomposition). The yield was 52.0% of the theoretical value and the analysis was as follows:

|  | C | H | N |
|---|---|---|---|
| Calculated | 61.94 | 6.07 | 8.03 |
| Found | 61.80 | 6.03 | 7.95 |

*Example X.—(2'-imidazolinyl)-methyl-2-ethoxy-1-naphthoate*

(2'-(2-imidazolinyl)-methyl-2-ethoxy-1-naphthoate was obtained by reacting 2-ethoxy-1-naphthoic acid and 2-chloro-methyl-2-imidazoline hydrochloride in accordance with the process as mentioned in Example IV. The product in a form of hydrochloride was obtained at the yield of 25% and had a melting point of 180–181° C. (with decomposition).

The analysis was as follows:

|  | C | H | N |
|---|---|---|---|
| Calculated | 60.95 | 5.92 | 8.38 |
| Found | 61.00 | 5.58 | 8.39 |

*Example XI.—(3'-methyl-3',4',5',6'-tetrahydropyrimidyl)-methyl-1-methoxy-2-naphthoate*

2-chloromethyl-3-methyl-3,4,5,6 - tetrahydropyrimidine was subjected to reaction with 1-methoxy-2-naphthoic acid.

The resulting product at the yield of 50% was crystallized out as oxalate from a mixture of ethanol and ether. The oxalate had a melting point of 123–124° C. and the analysis was as follows:

|  | C | N | H |
|---|---|---|---|
| Calculated | 59.75 | 5.52 | 6.97 |
| Found | 59.85 | 5.52 | 6.92 |

What is claimed is:
1. A compound of the formula

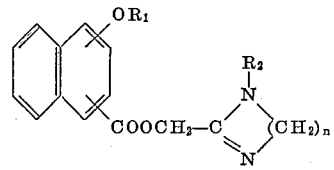

wherein each of $R_1$ and $R_2$ is a member selected from the group consisting of H and lower alkyl, and $n$ is one of the integers 2 and 3.

2. The compound of the formula

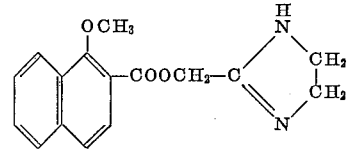

3. The compound of the formula

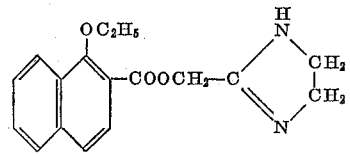

4. The compound of the formula
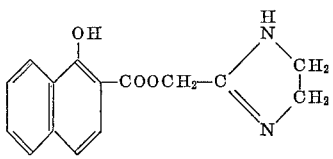
5. The compound of the formula
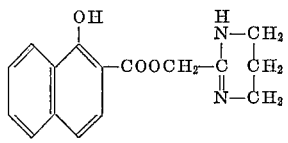
6. The compound of the formula
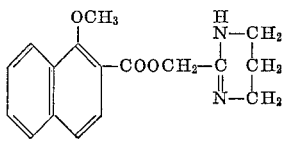
7. The compound of the formula
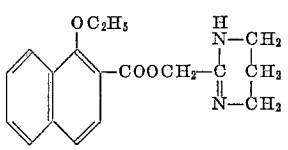
8. The compound of the formula
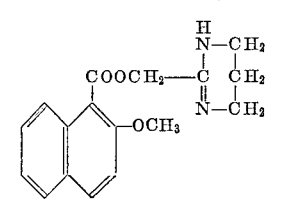
9. The compound of the formula
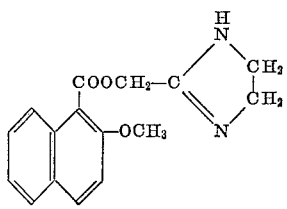
10. The compound of the formula
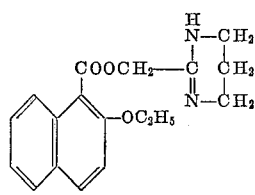
11. The compound of the formula
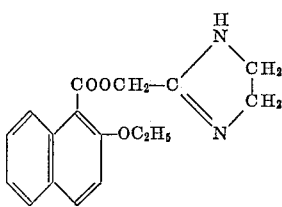
References Cited by the Examiner
UNITED STATES PATENTS
3,009,915  11/1961  Sahyun et al. _____ 260—251
NICHOLAS S. RIZZO, *Primary Examiner.*
JOHN D. RANDOLPH, *Examiner.*